United States Patent
Letscher et al.

(10) Patent No.: US 10,875,589 B2
(45) Date of Patent: Dec. 29, 2020

(54) DEVICE FOR INFLUENCING THE VERTICAL DYNAMICS OF AN AGRICULTURAL VEHICLE

(71) Applicant: Deere & Company, Moline, IL (US)

(72) Inventors: Jens Letscher, Ludwigshafen (DE); Jürgen Hollstein, Mannheim (DE); Christian von Holst, Hettenleidelheim (DE)

(73) Assignee: DEERE & COMPANY, Moline, IL (US)

( * ) Notice: Subject to any disclaimer, the term of this patent is extended or adjusted under 35 U.S.C. 154(b) by 370 days.

(21) Appl. No.: 15/835,271

(22) Filed: Dec. 7, 2017

(65) Prior Publication Data

US 2018/0162462 A1 Jun. 14, 2018

(30) Foreign Application Priority Data

Dec. 12, 2016 (DE) .......................... 10 2016 224 753

(51) Int. Cl.
*B62D 37/04* (2006.01)
*B62D 49/08* (2006.01)
*A01B 63/102* (2006.01)
*A01B 63/14* (2006.01)

(52) U.S. Cl.
CPC ............ *B62D 37/04* (2013.01); *A01B 63/102* (2013.01); *A01B 63/145* (2013.01); *B62D 49/085* (2013.01)

(58) Field of Classification Search
CPC ... B62D 37/04; B62D 49/085; A01L 363/102; A01B 63/145

USPC .......................................................... 701/50
See application file for complete search history.

(56) References Cited

U.S. PATENT DOCUMENTS

| 5,899,288 | A | * | 5/1999 | Schubert | ............... | F16F 15/027 |
| | | | | | | 180/89.12 |
| 6,000,703 | A | * | 12/1999 | Schubert | ............ | B60G 17/0165 |
| | | | | | | 180/89.12 |
| 6,898,501 | B2 | * | 5/2005 | Schubert | ............ | B60G 17/0165 |
| | | | | | | 180/89.12 |

(Continued)

FOREIGN PATENT DOCUMENTS

| DE | 39 42 057 A1 | 6/1991 |
| DE | 196 43 263 A1 | 4/1998 |

(Continued)

OTHER PUBLICATIONS

European Search Report issued in counterpart application No. 17204378.8 dated Apr. 25, 2018. (9 pages).

(Continued)

*Primary Examiner* — Peter D Nolan
*Assistant Examiner* — Ware L Louie

(57) ABSTRACT

A device for influencing vertical dynamics of an agricultural vehicle includes a mass mounted on the agricultural vehicle, a positioning system for controlling movement of the mass in vertical direction, a sensor device configured to detect a surface profile of an upcoming vehicle path segment, and an electronic control unit adapted to calculate an expected disturbance input for the upcoming vehicle path segment based on the detected surface profile. The electronic control unit operably controls the positioning system to execute a compensation movement of the vehicle that reduces the expected disturbance input by means of the mass.

21 Claims, 2 Drawing Sheets

(56) References Cited

U.S. PATENT DOCUMENTS

| | | | | |
|---|---|---|---|---|
| 8,065,054 | B2* | 11/2011 | Tarasinski | B60G 99/008 701/37 |
| 8,209,086 | B2* | 6/2012 | Ohashi | B60G 17/04 701/37 |
| 8,843,269 | B2* | 9/2014 | Anderson | B60C 23/002 701/36 |
| 9,145,039 | B2* | 9/2015 | Dehmel | B60G 17/08 |
| 9,188,980 | B2* | 11/2015 | Anderson | G05D 1/024 |
| 10,235,817 | B2* | 3/2019 | Saeger | G01C 7/04 |
| 2009/0038186 | A1* | 2/2009 | Osswald | E02F 3/96 37/413 |
| 2009/0112475 | A1* | 4/2009 | Christy | A01B 79/005 702/5 |
| 2009/0206589 | A1* | 8/2009 | Osswald | B66F 11/044 280/782 |
| 2011/0022267 | A1* | 1/2011 | Murphy | B60W 30/04 701/38 |
| 2018/0162462 | A1* | 6/2018 | Letscher | B62D 49/085 |

FOREIGN PATENT DOCUMENTS

| | | |
|---|---|---|
| DE | 10 2008 032 545 A1 | 1/2010 |
| DE | 10 2010 031 339 A1 | 1/2011 |
| DE | 102010013339 A1 | 1/2011 |
| DE | 10 2014 223 475 A1 | 5/2016 |
| DE | 10 2016 207 200 A1 | 11/2017 |
| DE | 10 2016 207 204 A1 | 11/2017 |
| EP | 0299223 A2 | 1/1989 |
| WO | 2015188926 A1 | 12/2015 |
| WO | 2016045869 A1 | 3/2016 |

OTHER PUBLICATIONS

DE Search Report issued in counterpart application No. 102016224753.0 dated Oct. 17, 2017 (10 pages).

European Search Report issued in counterpart application No. 18207605.9 dated May 6, 2019. (5 pages).

European Search Report issued in counterpart application No. 18207610.9 dated May 3, 2019. (8 pages).

European Search Report issued in counterpart application No. 18207615.8 dated May 3, 2019. (9 pages).

* cited by examiner

DEVICE FOR INFLUENCING THE VERTICAL DYNAMICS OF AN AGRICULTURAL VEHICLE

RELATED APPLICATIONS

This application claims priority to German Application Ser. No. 102016224753.0, filed Dec. 12, 2016, the disclosure of which is hereby expressly incorporated by reference in its entirety.

FIELD OF THE DISCLOSURE

The present disclosure relates to a device for influencing the vertical dynamics of an agricultural vehicle, in particular an agricultural tractor.

BACKGROUND

A device in the form of a sprung axle suspension for an agricultural tractor is known from DE 196 43 263 A1, among other places. The axle suspension includes a pendulum mounted rigid axle, which is supported at a front region of the frame of the agricultural tractor by means of a hydropneumatic shock absorption system. The rigid axle is a front axle of the agricultural tractor.

Since, as in the present case, the presence of a shock absorption system is as a rule limited to the front axle in agricultural vehicles, the rear axle remaining for the most part unsuspended because of the associated construction cost, limitations necessarily arise with regard to the achievable driver comfort.

Therefore, there is a need for a device adapted for use in agricultural vehicles for influencing the vertical dynamics.

SUMMARY

In one embodiment of the present disclosure, a device for influencing the vertical dynamics of an agricultural vehicle such as an agricultural tractor, includes an additional mass mounted on the agricultural vehicle, which mass can move in the vertical direction through the control of an associated positioning system, a sensor device for detecting a surface profile of an upcoming segment of the vehicle path, and an electronic control unit which calculates a disturbance input to be expected for the upcoming vehicle path segment according to the detected surface profile in order to carry out a compensation movement that reduces the expected disturbance input by controlling the positioning system by means of the additional mass.

In other words, an opposing moment suitable for compensating the expected disturbance input on the agricultural vehicle or on a vehicle chassis comprised by it can be produced by controlled movement of the additional mass. The device thus represents a possibility for compensation of movement or oscillation on an agricultural vehicle that is independent of a conventional spring suspension system.

The calculation of the expected disturbance input, thus the vertical acceleration likely to arise on the agricultural vehicle, can take place in particular by evaluating the course of the detected surface profile and the instantaneous driving speed of the agricultural vehicle, which is taken into account by the electronic control unit. The course of the surface profile in this case has a considerable effect on the characteristic, therefore on the amplitude and course of amplitude of the expected disturbance input. Thus, the amplitude and course of amplitude are as a rule much more pronounced when travelling over a deep hole than when travelling over a long bump, which necessitates a corresponding adjustment of the compensation movement carried out by means of the additional mass.

The calculation of the expected disturbance input and also the execution of the compensation movement respectively take place separately for a front and a rear axle of the agricultural vehicle, i.e., axle-specifically. Thus, the expected disturbance input at the front and rear axles arises with a time lag not only in correspondence with the instantaneous driving speed of the agricultural vehicle, but rather it is also damped to a different extent because of the, in most cases, different tires or tire volumes.

To this extent, the specific damping properties of the tire model that is used, as well as the instantaneous tire pressure, also have an effect so that it is conceivable that the electronic control unit, in calculating the expected disturbance input as well as in carrying out the compensation movement, additionally will take into account tire pressure information from a tire pressure monitoring system and data regarding the tire model. The tire pressure monitoring system in this case can be a component of a tire filling system of the agricultural vehicle.

In particular, the conduct of the compensation movement can take place while taking into account the reaction inertia of the positioning system through which an inertia-related time lag for an effective reduction of the expected disturbance input can be reduced.

The positioning system can be a hydraulically operated three-point hitch in the front or rear region of the agricultural vehicle. The three-point hitch can also carry an agricultural implement or an added weight as the additional mass. In conducting the compensation movement, the electronic control unit takes into account the mass and center of gravity of the agricultural implement or the added weight. The data are either known on the basis of manufacturers' specifications for the agricultural implement or added weight or, if the agricultural implement is one with a load that varies over time, for example, by evaluating position and power variables detected by sensor on the three-point hitch. A suitable procedure in the form of an automated calibration routine in this respect is described in DE 10 2016 207 200 A1 or DE 10 2016 207 204 A1.

At this point it should be noted that the positioning system, like the additional weight that can be moved by the positioning system, can be formed by a hydraulically adjustable front loader as can be employed on agricultural tractors to carry out loading operations. The calmer driving behavior that can be achieved by means of the device enables a corresponding increase of the driving or transport speed when conducting loading operations.

The sensor device is typically made as an imaging sensor system, in particular in the form of a 3D laser scanner, a stereoscopic camera, or a radar system. This makes a three-dimensional detection of the surface profile possible so that not only the amplitude and course of amplitude of the expected disturbance, but also a relevant distance from the front or rear axle of the agricultural vehicle can be calculated. If the instantaneous driving speed of the agricultural vehicle is known, the latter makes it possible to estimate the initial time of the expected disturbance input for each of the two axles separately.

In addition, it is conceivable for the electronic control unit to modify the calculation of the expected disturbance input in dependence on a status parameter that gives the soil condition. More precisely, the status parameter can describe the softness of the ground being traversed, consequently the upcoming change of the surface profile due to soil compression caused by the tires. From experience, the expected disturbance input will be lower the softer the traversed soil is. The modification can correspondingly take place from predetermined categories for the status parameter, in particular with regard to the soil moisture (dry or soggy fields) and the soil properties (road asphalt, consolidated or unconsolidated service road, loose or packed field).

The determination of the status parameter can take place by means of a near infrared spectrometer sensing the upcoming vehicle path segment or from mapped soil data, which the electronic control unit compares with vehicle position data provided by a navigation system. The near infrared spectrometer in this case enables a precise evaluation of the soil moisture, whereas the mapped soil data can contain additional information regarding the soil properties. The latter information is either stored in a local memory associated with the navigation system or is available in a central data bank (cloud), which the electronic control unit accesses via a wireless network connection. Also conceivable is a determination of the soil qualities by analysis of a frequency or amplitude spectrum detected by a sensor in a tire belt.

In order to take into account the soil moisture, such as of a field, on the basis of weather effects, the electronic control unit can dynamically match the mapped soil data to meteorological data.

Furthermore, a wheel suspension device can be adjustable with respect to its suspension or damping characteristics, a cab suspension, or a present seat suspension. Here, the electronic control unit matches the suspension or damping characteristic in terms of a further reduction of the expected disturbance input. In the case of an agricultural tractor, a wheel suspension device associated with the front axle is usually provided. The suspension is supported by an active cab or seat suspension based on the equipment of the agricultural tractor.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

Figure 1:
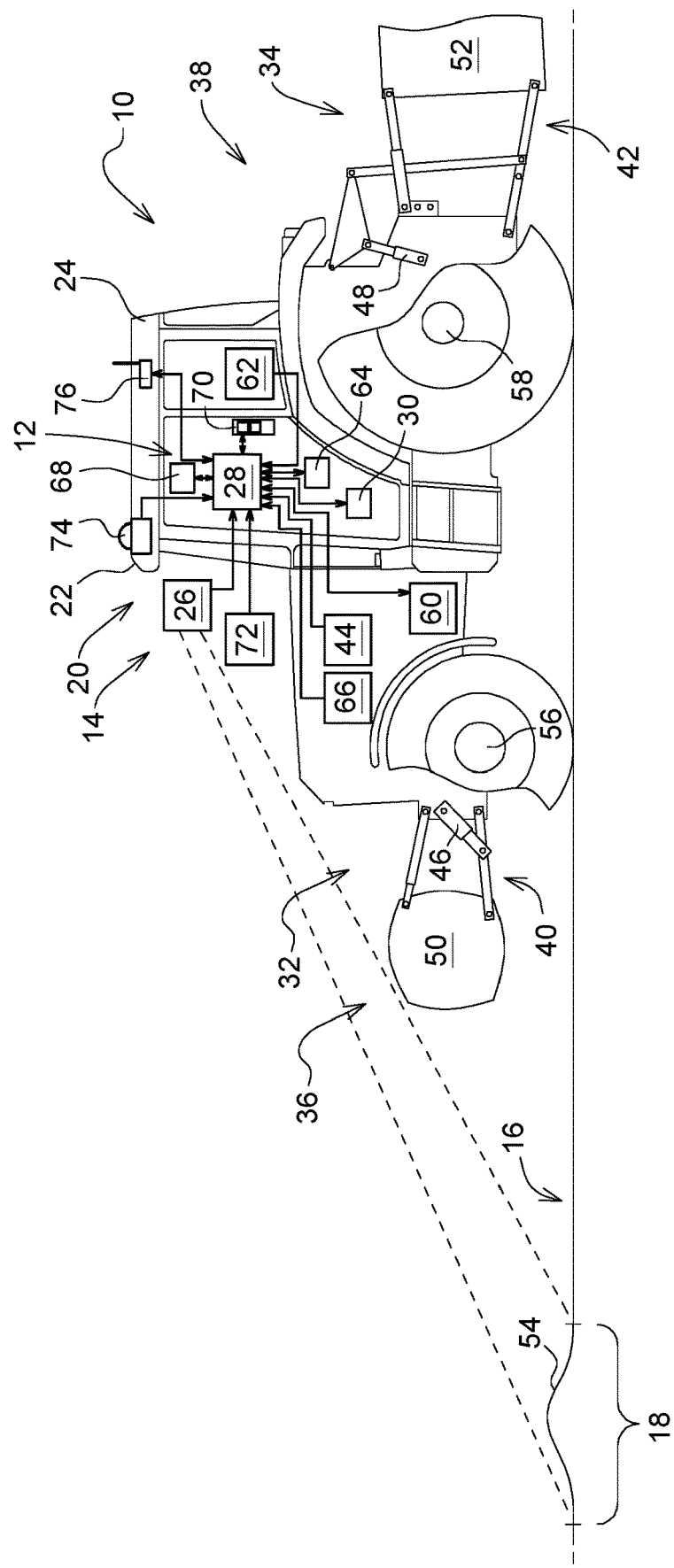
FIG. 1 shows one embodiment of a device for influencing the vertical dynamics of an agricultural vehicle.

FIG. 1 shows an embodiment of a device for influencing the vertical dynamics of an agricultural vehicle, in this case an agricultural tractor.

The device 12, which is accommodated in agricultural tractor 10, includes a sensor device 14 for detection of a surface profile 16 of an upcoming vehicle path segment 18. The sensor device 14 is made as an imaging sensor system 20, namely in the form of a stereoscopic camera 26 mounted in the front region 22 of a cab roof 24, for three-dimensional detection of the surface profile 16 of the upcoming vehicle path segment 18. Alternatively, it can also be a 3D laser scanner or a radar system (not shown). The image data provided by the sensor device 14 are sent for further processing to an electronic control unit 28, which calculates an expected disturbance input for the upcoming vehicle path segment 18 from the detected surface profile 16.

More precisely, the calculation of the expected disturbance input, consequently the vertical acceleration arising on the agricultural tractor 10 caused by the disruption, takes place by evaluating the course of the detected surface profile 16, where the instantaneous driving speed of the agricultural tractor 10 is additionally taken into account by the electronic control unit 28.

In addition, a first or second positioning system 32, 34 is present. The first or second positioning system 32, 34 is a front or rear three-point hitch 40, 42 mounted in the front or rear region 36, 38 of the agricultural tractor 10. Each of the two three-point hitches 40, 42 can be pivoted by the electronic control unit 28 through control of an associated hydraulic system 44 via associated hydraulic cylinders 46, 48. In the present case the front three-point hitch 40 carries an added weight 50 and the rear three-point hitch 42 carries an agricultural implement 52 in the form of a schematically represented soil working implement (see FIG. 2). Agricultural implement 52 and added weight 50 ultimately form additional masses mounted on the agricultural tractor 10 or the three-point hitches 40, 42, which masses can be moved or accelerated in the vertical direction by control of the first or second positioning system 32, 34.

As an example, the surface profile 16 detected by the sensor device 14 has a bump 54 that is ahead in the driving direction of the agricultural tractor 10. From the image data provided by the sensor device 14, the electronic control unit 28 derives the distance of the upcoming bump 54 from the front and rear axles 56, 58 of the agricultural tractor 10, in addition to the amplitude and course of the amplitude of the disturbance input expected because of the bump. From the derived distance, the electronic control unit 28 separately estimates the expected initial time of the expected disturbance input for each of the two axles 56, 58 in dependence on the instantaneous driving speed of the agricultural tractor 10.

Moreover, a wheel suspension device 60 associated with the front axle and supported by an active cab or seat suspension 62, 64 is provided. Both the wheel suspension device 60 and the cab or seat suspension 62, 64 can be adjusted by the electronic control unit 28 with respect to their suspension or damping characteristic.

Figure 2:
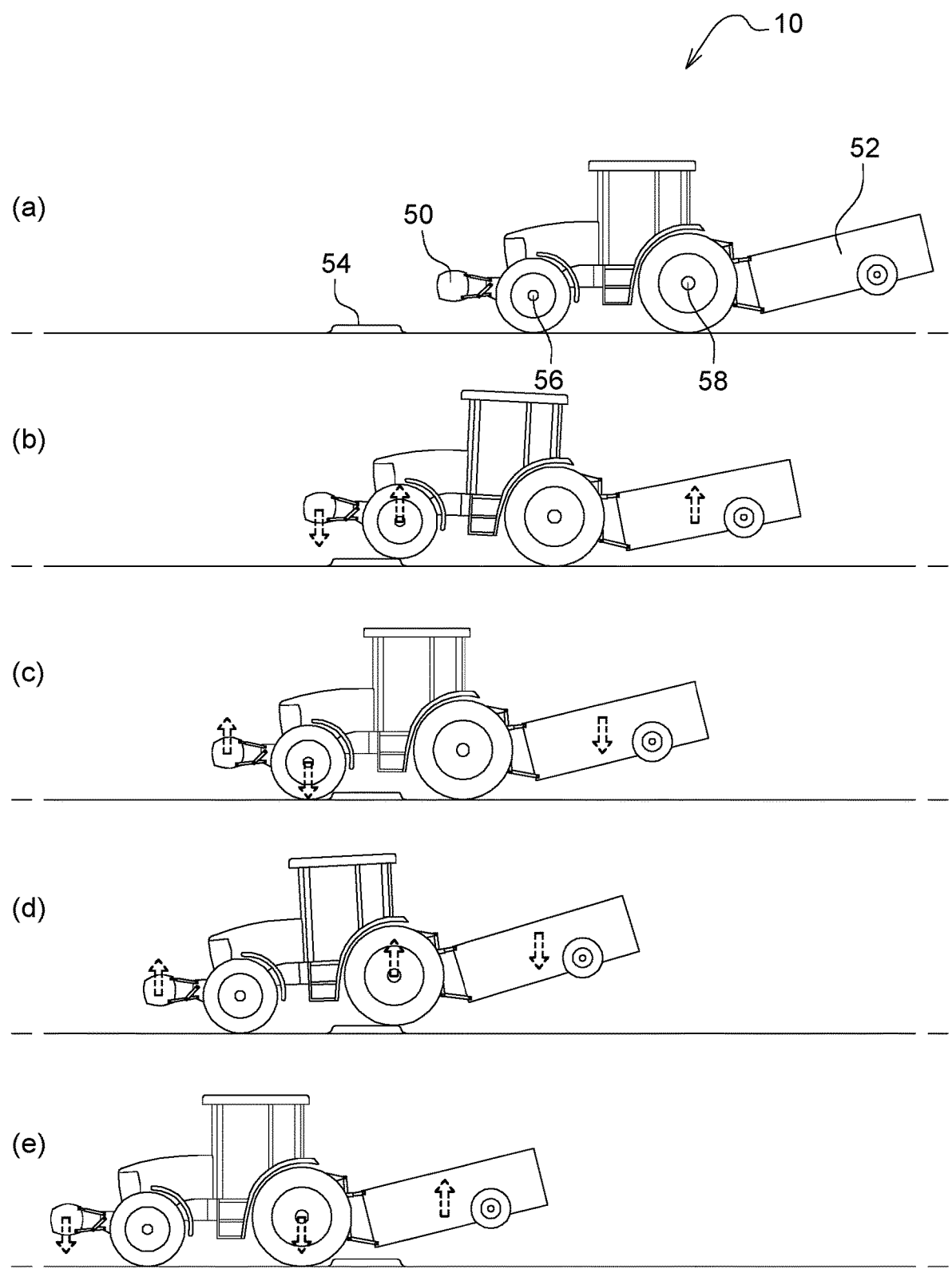
FIG. 2 shows a diagram illustrating the functioning of the device of FIG. 1 when traveling over a bump.

FIG. 2 shows a sequence illustrating the functioning of the device when traveling over a bump.

In a first phase (a), the upcoming bump 54 is detected by means of the sensor device 14. Based on the image data provided by the sensor device 14, the electronic control unit 28 determines the disturbance input to be expected in traveling over the bump 54 with regard to amplitude, course of amplitude, and initial time for each of the two axles 56, 58.

Based on the information, the electronic control unit 28 carries out, in the subsequent phases (b) to (e), a compensation movement that reduces the expected disturbance input by controlling the first or the second positioning system 32, 34 by means of the additional masses formed in each case by the added weight 50 or the agricultural implement 52. The reaction inertia of the two positioning systems 32, 34 is taken into account by the electronic control unit 28 here.

The execution of the compensation movement is initiated in a second phase (b) as soon as the front tires of the agricultural tractor 10 reach or contact the bump 54. For this, by lowering the added weight 50 and simultaneously raising the agricultural implement 52, a counter moment that reduces the expected disturbance input is produced on the agricultural tractor 10. When the front tires leave the hump 54, the execution of the compensation movement in a third phase (c) is stopped by raising the added weight 50 and simultaneously lowering the agricultural implement 52. The same operation repeats for the rear tires of the agricultural tractor 10 in a fourth and fifth phase (d), (e).

At the same time the electronic control unit 28 undertakes an adjustment of the suspension or damping characteristic of the wheel suspension device 60 or the active cab or seat suspension 62, 64 with the goal of the further reduction of the expected disturbance input.

The calculation of the expected disturbance input and the execution of the compensation movement take place separately for the front and rear axles 56, 58. Thus the expected disturbance input at the front and rear axles 56, 58 occurs not only offset in time, but it also has corresponding differences with regard to amplitude and course of amplitude because of the different tires or tire volumes. Thus, the large-volume rear tires provided on the rear axle 58 according to FIG. 1 lead to higher damping of the expected disturbance input compared to the front axle 56 (with its relatively low-volume front tires), which necessitates an appropriate adjustment of the compensation movement that is carried out by means of the added weight 50 or the agricultural implement 52.

In this respect, the specific damping properties of the tire model that is used as well as the instantaneous tire pressure also have an effect, so that the electronic control unit 28, in calculating the expected disturbance input and the execution of the compensation movement, takes into account tire pressure information of a tire pressure monitoring system 66 in addition to data concerning the tire model. The tire pressure monitoring system here is a component of a tire filling system (not shown) of the agricultural tractor 10.

In carrying out the compensation movement, the electronic control unit 28 additionally takes into account the mass and center of gravity of the added weight 50 or the agricultural implement 52. The corresponding data are known on the basis of manufacturers' specifications for the added weight 50 or the agricultural implement 52 and are stored in a local memory 68 associated with the electronic control unit 28. The relevant added weight 50 or agricultural implement 52 can be selected via an operator terminal 70 that is connected to the electronic control unit 28. Optionally, the mass and center of gravity of the added weight 50 or the agricultural implement 52 are determined by the electronic control unit 28 through an automatic calibration routine.

In addition, the electronic control unit 28 modifies the calculation of the expected disturbance input in dependence on a status parameter that gives the soil status. The status parameter describes the softness of the traversed soil, therefore the upcoming change of the surface profile 16 on the basis of a soil compression produced by the tires. From experience, the expected disturbance input here will be lower, the softer the traversed soil is. The electronic control unit 28 undertakes the modification in correspondence with preset categories for the status parameter, more precisely, with regard to the soil moisture (dry or soggy field), and the soil properties (road asphalt, consolidated or unconsolidated service road, loose or packed field).

The determination of the status parameter takes place by means of a near infrared spectrometer 72 that senses the upcoming vehicle path segment 18 or from mapped soil data, which the electronic control unit 28 compares with vehicle position data provided by a navigation system 74. The latter data can be employed by the electronic control unit 28 at the same time for (redundant) determination of the instantaneous driving speed by evaluating the time-wise course of the vehicle position data.

The near infrared spectrometer 72 enables a precise determination of the soil moisture, whereas the mapped soil data contain additional information regarding the soil properties. The latter are stored either in the local memory 68 or are available in a central data bank (cloud), which the electronic control unit 28 accesses over a wireless network connection produced by means of a GSM interface 76.

In order to take into account the soil moisture, in particular of a field, on the basis of weather effects, the electronic control unit 28 can via the GSM interface 76 at the same time be provided with meteorological data from which it dynamically adjusts the mapped soil data.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A device for influencing vertical dynamics of an agricultural vehicle, comprising:
   a mass mounted on the agricultural vehicle,
   a positioning system for controlling movement of the mass in vertical direction,
   a sensor device configured to detect a surface profile of an upcoming vehicle path segment, and
   an electronic control unit adapted to calculate an expected disturbance input for the upcoming vehicle path segment based on the detected surface profile, wherein, the electronic control unit operably controls the positioning system to execute a compensation movement of the vehicle that reduces the expected disturbance input by means of the mass.

2. The device of claim 1, wherein the calculation of the expected disturbance input and the execution of the compensation movement occur separately for a front axle and a rear axle of the agricultural vehicle.

3. The device of claim 1, wherein the electronic control unit receives tire pressure information of a tire pressure monitoring system and data related to a tire model when it calculates the expected disturbance input and executes the compensation movement.

4. The device of claim 1, wherein the execution of the compensation movement takes place while taking into account a reaction inertia of the positioning system.

5. The device of claim 1, wherein the positioning system comprises a hydraulically operated three-point hitch in the front or rear region of the agricultural vehicle.

6. The device of claim 1, wherein the sensor device comprises an imaging sensor system.

7. The device of claim 6, wherein the imaging sensor system comprises a three-dimensional laser scanner, a stereoscopic camera, or a radar system.

8. The device of claim 1, wherein the electronic control unit is configured to modify the calculation of the expected disturbance input in dependence on a soil status.

9. The device of claim 8, further comprising:
   a near infrared spectrometer configured to sense the upcoming vehicle path segment; and a navigation system in communication with the electronic control unit for detects vehicle position data, wherein the soil status is determined based on the upcoming vehicle path segment sensed by the spectrometer or from mapped soil data which is compared with the vehicle position data received from the navigation system.

10. The device of claim 9, wherein the electronic control unit dynamically adjusts the mapped soil data according to meteorological data.

11. The device of claim 1, further comprising a wheel suspension device being adjustable with respect to its suspension or damping characteristic, a cab suspension, or a seat suspension, where the electronic control unit operably adjusts the suspension or damping characteristics based on a further reduction of the expected disturbance input.

12. The vehicle of claim 1, wherein the mass comprises one or more of an agricultural implement and an added weight.

13. An agricultural vehicle, comprising:
a device for influencing vertical dynamics on the vehicle, the device including a mass mounted on the agricultural vehicle,
a positioning system for controlling movement of the mass in a vertical direction,
a sensor device configured to detect a surface profile of an upcoming vehicle path segment, and
an electronic control unit adapted to calculate an expected disturbance input for the upcoming vehicle path segment based on the detected surface profile,
wherein, the electronic control unit operably controls the positioning system to execute a compensation movement of the vehicle that reduces the expected disturbance input by means of the mass.

14. The vehicle of claim 13, wherein the electronic control unit is configured to modify the calculation of the expected disturbance input in dependence on a soil status.

15. The vehicle of claim 14, further comprising:
a near infrared spectrometer configured to sense the upcoming vehicle path segment; and
a navigation system in communication with the electronic control unit for detects vehicle position data,
wherein the soil status is determined based on the upcoming vehicle path segment sensed by the spectrometer or from mapped soil data which is compared with the vehicle position data received from the navigation system.

16. The vehicle of claim 15, wherein the electronic control unit dynamically adjusts the mapped soil data according to meteorological data.

17. The vehicle of claim 13, further comprising a wheel suspension device being adjustable with respect to its suspension or damping characteristic, a cab suspension, or a seat suspension, where the electronic control unit operably adjusts the suspension or damping characteristics based on a further reduction of the expected disturbance input.

18. The vehicle of claim 13, wherein the calculation of the expected disturbance input and the execution of the compensation movement occur separately for a front axle and a rear axle of the agricultural vehicle.

19. The vehicle of claim 13, wherein the electronic control unit receives tire pressure information of a tire pressure monitoring system and data related to a tire model when it calculates the expected disturbance input and executes the compensation movement.

20. The vehicle of claim 13, wherein the execution of the compensation movement takes place while taking into account the reaction inertia of the positioning system.

21. The vehicle of claim 13, wherein the sensor device comprises an imaging sensor system.

* * * * *